(12) United States Patent
Barjhoux et al.

(10) Patent No.: US 12,072,143 B2
(45) Date of Patent: Aug. 27, 2024

(54) PLANT AND METHOD FOR LIQUEFYING GAS

(71) Applicant: L'Air Liquide, Societe Anonyme pour l'Etude et l'Exploitation des Procedes Georges Claude, Paris (FR)

(72) Inventors: Pierre Barjhoux, Sassenage (FR); Fabien Durand, Sassenage (FR); Franck Delcayre, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 380 days.

(21) Appl. No.: 17/620,979

(22) PCT Filed: Jun. 8, 2020

(86) PCT No.: PCT/EP2020/065778
§ 371 (c)(1),
(2) Date: Dec. 20, 2021

(87) PCT Pub. No.: WO2020/259990
PCT Pub. Date: Dec. 30, 2020

(65) Prior Publication Data
US 2022/0357103 A1    Nov. 10, 2022

(30) Foreign Application Priority Data
Jun. 27, 2019   (FR) .................................... 1907021

(51) Int. Cl.
*F25J 1/02*     (2006.01)
*F01D 25/22*    (2006.01)
*F25J 1/00*     (2006.01)

(52) U.S. Cl.
CPC ............. *F25J 1/0288* (2013.01); *F25J 1/001* (2013.01); *F25J 1/0035* (2013.01); *F01D 25/22* (2013.01);
(Continued)

(58) Field of Classification Search
CPC .......... F25J 1/0288; F25J 1/001; F25J 1/0035; F25J 2215/10; F25J 2230/20;
(Continued)

(56) References Cited

U.S. PATENT DOCUMENTS

| 11,493,240 B2 | 11/2022 | Saito et al. | |
| 2006/0218939 A1* | 10/2006 | Turner | F25J 1/0045 62/4 |

(Continued)

FOREIGN PATENT DOCUMENTS

| JP | 2016 183827 | 10/2016 |
| JP | 2019 078514 | 5/2019 |

OTHER PUBLICATIONS

Vander Arend, "Large-scale liquid hydrogen production," Chemical Engineering Progress, vol. 57, No. 10, Oct. 1, 1961, pp. 62-67.

*Primary Examiner* — John F Pettitt, III
*Assistant Examiner* — Esmeralda Arreguin-Martinez
(74) *Attorney, Agent, or Firm* — Justin K. Murray

(57) ABSTRACT

Plant and method for liquefying a flow of gas, having a cooling circuit that includes at least one exchanger (5) for cooling the gas, and at least one expansion turbine (6) which is mounted on a rotary axle which is supported by at least one bearing (7) of the gas-static type, the cooling circuit (2) also including a pressurized gas injection conduit that is configured to supply pressurized gas to the bearing (7) in order to provide support to the rotary axle, the plant (1) further includes a recovery conduit (9) that is configured to recycle at least a portion of the gas which has been used to (Continued)

support the rotary axle of the bearing (7) with a view to liquefying the gas.

11 Claims, 1 Drawing Sheet

(52) U.S. Cl.
CPC ........ *F25J 2215/10* (2013.01); *F25J 2230/20* (2013.01); *F25J 2240/02* (2013.01); *F25J 2245/02* (2013.01); *F25J 2290/12* (2013.01)

(58) Field of Classification Search
CPC .. F25J 2240/02; F25J 2245/02; F25J 2290/12; F05D 2240/50; F16C 32/0614; F01D 25/22; F01D 25/125
See application file for complete search history.

(56) References Cited

U.S. PATENT DOCUMENTS

| | | | |
|---|---|---|---|
| 2007/0107465 A1* | 5/2007 | Turner | F25J 1/0201 |
| | | | 62/613 |
| 2010/0272634 A1* | 10/2010 | Schwartz | C01B 3/0089 |
| | | | 422/187 |
| 2014/0053598 A1 | 2/2014 | Ishimaru et al. | |
| 2017/0191379 A1* | 7/2017 | Preuss | F01K 13/02 |
| 2019/0041124 A1 | 2/2019 | Berti et al. | |

\* cited by examiner

[Fig. 1]
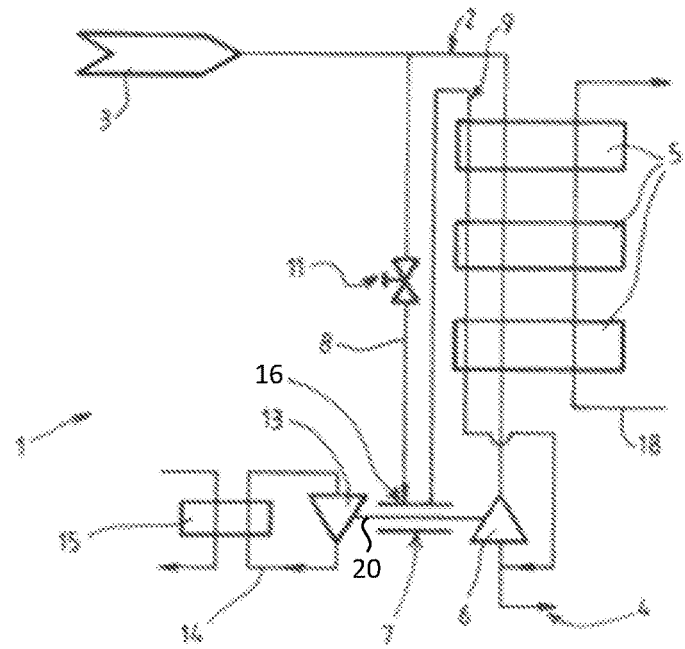
[Fig. 2]
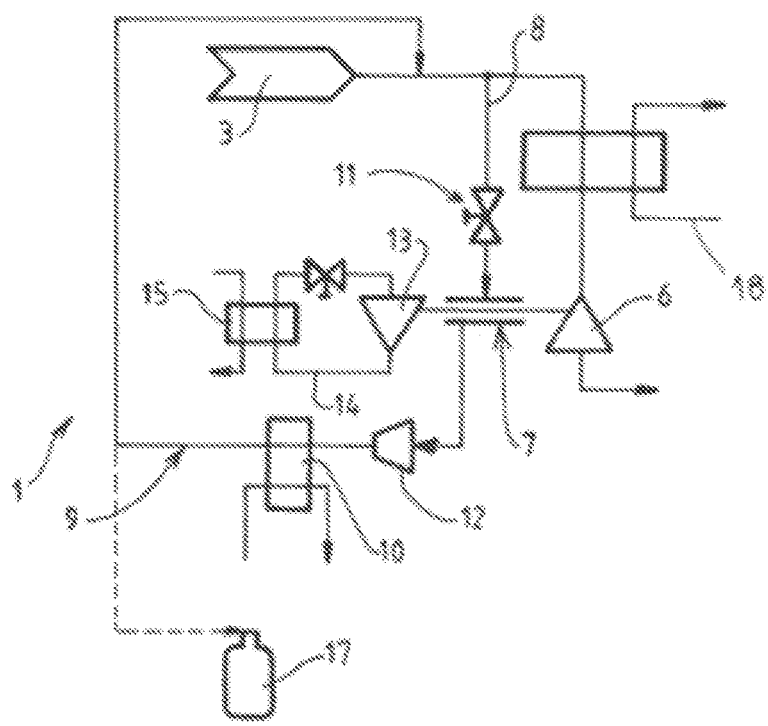

PLANT AND METHOD FOR LIQUEFYING GAS

CROSS-REFERENCE TO RELATED APPLICATIONS

This application is a § 371 of International PCT Application PCT/EP2020/065778, filed Jun. 8, 2020, which claims § 119(a) foreign priority to French patent application FR 1 907 021, filed Jun. 27, 2019.

BACKGROUND

Field of the Invention

The invention relates to a plant and a method for liquefying gas.

More specifically, the invention relates to a plant for liquefying a flow of gas, such as hydrogen, the plant comprising a cooling circuit provided with an upstream end intended to be connected to a source of pressurized gas to be liquefied and a downstream end intended to be connected to a component for using the liquefied gas, the plant comprising, between the upstream and downstream ends, a set of components intended to liquefy said gas and comprising at least one exchanger for cooling the gas, and at least one expansion turbine mounted on a rotary shaft supported by at least one bearing of the gas-static type, the cooling circuit comprising a pressurized gas injection conduit having an upstream end intended to receive pressurized gas supplied by the source and a downstream end connected to the bearing to support the rotary shaft, the plant comprising a conduit for recovering the gas that has been used in the bearing, the recovery conduit comprising an upstream end connected to the bearing and a downstream end.

Related Art

Liquefying gases conventionally involves one or more stages for expanding the gas, exploiting the pressure energy supplied to a working gas, which gas is conventionally compressed at ambient temperature.

These expansion stages are conventionally carried out by centripetal turbines that extract heat from the working fluid (helium, hydrogen, neon, nitrogen, oxygen, etc. or mixtures thereof) in order to transfer it to the fluid to be liquefied.

Several technologies are used in gas liquefiers to support a rotary shaft, at the end of which a turbine is attached.

Thus, oil wedge effect bearings use a closed circuit of synthetic oil that continuously injects this fluid into the shaft in order to support said shaft. A lift pump is generally installed to compensate for the pressure losses associated with injecting fluid into specific nozzles.

Another known solution uses magnetic bearings (active or passive). According to this technology, magnets positioned on the rotor allow said rotor to be magnetically supported by virtue of magnets installed opposite them on the fixed part of the turbine engine.

For its part, dynamic gas bearing technology uses a gas cushion formed by the rotation of the turbine. The effect of reacting in the closed gas volume, associated with specific geometry of the fixed parts of the turbine engine, enables the rotary shaft to be supported.

Gas-static bearing technology uses a continuous injection of working gas on the shaft to allow it to be continuously supported. This solution is very reliable and experiences little pollution from the expanded gas. However, this solution consumes working gas for this requirement. This technology also results in greater electricity consumption at the compression station.

One way of optimizing these gas flows used in the bearings involves compressing this gas flow that has been used in the bearing. This gas is compressed, for example, in the main cycle compressor or in a compressor parallel to the plant set to the suitable pressure levels. However, this method results in higher energy consumption and an additional investment cost to avoid continuously losing this product. Another solution involves compressing this gas in high-pressure bottles or cylinders for the recovery thereof (for sale in gaseous form for an additional market).

However, these solutions are imperfect and unsatisfactory.

SUMMARY OF THE INVENTION

An aim of the present invention is to overcome all or some of the disadvantages of the prior art identified above.

To this end, the plant according to the invention, also according to the generic definition provided in the above preamble, is basically characterized in that the downstream end of the gas recovery conduit is connected to the cooling circuit between the upstream and downstream ends thereof in order to recycle at least some of the gas that has been used to support the rotary shaft of the bearing with a view to liquefying said gas.

This allows innovative recovery of the gases from one or more bearings in the case of a turbine supported using gas-static bearing technology, with the bearing gas being identical to the fluid to be liquefied.

Furthermore, embodiments of the invention can comprise one or more of the following features:
- the pressurized injection conduit comprises at least one gas flow control valve, in particular an expansion valve;
- the recovery conduit comprises a portion for exchanging heat with at least one cooling heat exchanger;
- the recovery conduit comprises a downstream end connected to the outlet of the at least one expansion turbine;
- between the upstream and downstream ends thereof the recovery conduit exchanges heat with the at least one gas cooling exchanger of the cooling circuit;
- the recovery conduit exchanges heat with the one or more gas cooling exchangers of the cooling circuit via one or more passages in the one or more exchangers that are separate from the passages provided for the cooling circuit (2), i.e. the gas of the cooling circuit and the gas circulating in the recovery conduit are cooled in parallel and separately before being mixed downstream;
- the recovery conduit comprises a downstream end connected to the upstream end of the cooling circuit;
- the recovery conduit comprises a compressor configured to compress the gas before it is re-injected into the cooling circuit;
- the at least one expansion turbine is mounted on a first end of the rotary shaft, with the other end of the rotary shaft supporting a compressor located in a loop circuit for a working gas, said circuit comprising a portion exchanging heat with a cooling exchanger in order to cool the gas compressed by the compressor;
- the downstream end of the injection conduit comprises at least one nozzle for injecting gas into the bearing that is configured to ensure a controlled reduction in the pressure of said gas in the bearing and to keep the pressure of said gas output from the bearing above a determined threshold.

The invention also relates to a method for liquefying a flow of gas, such as hydrogen, in a liquefying plant comprising a cooling circuit provided with an end connected to a source of pressurized gas to be liquefied and a downstream end intended to be connected to a component for using the liquefied gas, the plant comprising, between the upstream and downstream ends, a set of components intended to liquefy said gas and comprising at least one exchanger for cooling the gas, and at least one expansion turbine mounted on a rotary shaft supported by at least one gas-static bearing, the circuit of the plant comprising a pressurized gas injection conduit having an upstream end intended to receive pressurized gas supplied by the source and a downstream end connected to the gas-static bearing to support the rotary shaft, the plant comprising a conduit for recovering the gas that has been used in the bearing comprising an upstream end connected to the bearing and a downstream end, the method comprising a step of re-injecting, into the cooling circuit, at least some of the gas that has been used to support the rotary shaft of the bearing with a view to liquefying said gas.

According to other possible particular features:
the gas to be liquefied is at least one from among hydrogen, helium, neon, nitrogen, oxygen, argon;
the pressure of the gas to be liquefied originating from the source at the upstream end of the cooling circuit ranges between 5 and 80 bar abs, the pressure of the gas recovered from the upstream end of the recovery conduit ranges between 1.5 bar abs and 20 bar abs.

The invention can also relate to any alternative device or method comprising any combination of the features above or below within the scope of the claims.

BRIEF DESCRIPTION OF THE FIGURES

Further particular features and advantages will become apparent upon reading the following description, which is provided with reference to the figures, in which:

FIG. 1 shows a partial and schematic view illustrating a first example of the structure and operation of a plant according to the invention;

FIG. 2 shows a partial and schematic view illustrating a second example of the structure and operation of a plant according to the invention.

DETAILED DESCRIPTION OF THE INVENTION

The liquefying plant 1 shown in [FIG. 1] and [FIG. 2] is a plant for liquefying a flow of hydrogen (H2), for example. Of course, the invention is not limited to this application, but could relate to any other gas or gas mixture.

The plant 1 comprises a cooling circuit 2 provided with an upstream end connected to a source 3 of pressurized gas to be liquefied, for example, hydrogen at a pressure ranging between 5 and 80 bar abs.

The cooling circuit 2 comprises a downstream end 4 intended to be connected to a component for using/recovering liquefied gas (storage, for example).

The plant 1 conventionally comprises, between the upstream and downstream ends 4, a set of components 5, 6 intended to liquefy the gas. These components particularly comprise at least one gas cooling exchanger 5 (in particular a plurality of exchangers in series) and one or more expansion turbines 6.

Of course, the liquefying plant 1 shown is simplified but can comprise any other suitable component (compressor, valve, etc.).

The expansion turbine 6 that is illustrated is conventionally mounted on a rotary shaft supported by at least one gas-static type bearing 7.

The cooling circuit 2 comprises a pressurized gas injection conduit 8 having an upstream end connected to the upstream end of the cooling circuit 2 and receiving pressurized gas supplied by the source 3.

The injection conduit 8 has a downstream end connected to the bearing 7 for supporting the rotary shaft 20. For example, the downstream end of the injection conduit 8 comprises at least one nozzle 16 for injecting gas into an inlet of the bearing 6.

The plant 1 comprises at least one recovery conduit 9 for the gas that has been used in the bearing 7. This recovery conduit 9 comprises an upstream end connected to the bearing 7 (at an outlet of the bearing) and a downstream end. According to an advantageous particular feature, the downstream end of the gas recovery conduit 9 is connected to the cooling circuit 2 between the upstream and downstream ends thereof in order to recycle at least some of the gas that has been used to support the rotary shaft of the bearing 7 with a view to liquefying said gas with the rest of the gas supplied by the source 3.

The pressurized injection conduit 8 preferably comprises at least one gas flow control valve 11, in particular an expansion valve.

The expansion turbine 6 is provided to extract energy from the gas to be liquefied. For example, this turbine 6 can be installed at the cold end of the method and in such a way as to work quasi-isentropically in the liquid phase.

In the example of [FIG. 1], the recovery conduit 9 comprises a downstream end connected to the outlet of the expansion turbine 6. Moreover, between its upstream and downstream ends, the recovery conduit 9 optionally exchanges heat with the gas cooling exchangers 5 of the cooling circuit 2. In other words, the gas that has been used in the bearing 7 is optionally cooled and liquefied before being mixed with the liquefied gas obtained in the cooling circuit 2.

As illustrated, the recovery conduit 9 optionally can exchange heat with the gas cooling exchangers 5 of the cooling circuit 2 via one or more additional passages in the one or more exchangers 5 that are separate from the main passages provided for the cooling circuit 2. In other words, the gas in the cooling circuit 2 and the gas circulating in the recovery conduit 9 can be cooled in the same exchangers 5 but in parallel and separately before being mixed downstream. Thus, the gas circulating in the recovery conduit can be circulated and cooled in dedicated passages of all or some of the exchangers 5 and at a lower pressure than the gas of the cooling circuit, circulating in other passages of these exchangers. Of course, the recovery conduit 9 can be connected downstream of the expansion turbine without necessarily passing through the one or more exchangers 5 for cooling the gas of the cooling circuit 2.

In other words, contrary to what is shown in [FIG. 1], the conduit 9 does not necessarily pass through the one or more exchanger(s) 5.

The main passages in the heat exchangers 5 (aluminum finned plate type exchangers, for example) can be configured to exchange heat between the fluid to be liquefied and a cooling fluid 18 (which can be different from the type of gas to be liquefied).

The pressurized gas taken to support the shaft of the bearing 7 can be injected into the bearing via one or more nozzles that partially expand this pressurized gas.

For example, if the supply for the source is at 30 bar absolute, the bearings 7 can be designed so that the shaft is supported and so that the expanded gas returns to an intermediate pressure of approximately a few bar absolute (3 bar abs, for example). This does not require any additional cost, only the diameter of the injection nozzles can be modified to achieve this objective. The gas injection nozzles in the static bearings 7 can be designed so as not to consume all the pressure available in the supply gas, i.e. so that upon exiting the bearing 7 the gas still has enough driving pressure to overcome the inherent pressure losses in the rest of the circuit (mainly passage through the downstream heat exchangers 5).

This solution avoids excess gas consumption by liquefying this gas from the bearings in parallel circuits and then mixing it in the main liquefying circuit downstream of the turbine 6.

This solution does not require parallel compression machines or an increase in the mass or volume capacity of the existing compressor station.

For example, 5% of the gas supplied by the source 3 is taken and used to be injected into the bearings of the expansion turbine 6 to be supported. This 5% is ultimately found in the liquefied flow.

In the embodiment of [FIG. 2], the recovery conduit 9 comprises a downstream end connected to the upstream end of the cooling circuit 2. In other words, the gas used in the bearings 7 is recycled upstream in the cooling circuit 2. In this case, as illustrated, the gas is preferably compressed in a compressor 12 (or similar) and cooled in an exchanger 10 (or similar) before being re-injected into the cooling circuit 2, in order to adapt to the pressure and temperature conditions in the circuit 2 that it joins.

As is schematically illustrated by the dashed lines in [FIG. 2], some of this recovered, compressed and cooled gas can be used to fill pressurized gas stores 17.

As is schematically shown, the expansion turbine 6 can be mounted on a first end of a rotary shaft or axle, with the other end of the shaft supporting a compressor 13 of the plant 1. This compressor 13 can be a compressor of the plant 1 compressing the gas to be liquefied.

The compressor 13 can be located in a loop circuit 14 (particularly a closed circuit) for a working gas. This loop circuit 14 can comprise a portion exchanging heat with a cooling exchanger 15 for cooling the gas compressed by the compressor 13. The cooling exchanger 15 can be cooled by a cold fluid.

While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order; such as first and second, it should be understood to order; in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed; it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A plant for liquefying a flow of hydrogen gas, comprising:
    a cooling circuit that is provided with an upstream end intended to be connected to a source of a pressurized gas to be liquefied, a downstream end intended to be connected to a component for using the liquefied gas, in between the upstream and downstream ends, a set of components intended to liquefy said pressurized gas and that comprises at least one heat exchanger for cooling the pressurized gas, at least one expansion turbine mounted on a rotary shaft supported by at least one gas-static bearing, and a pressurized gas injection conduit having an upstream end intended to receive the pressurized gas supplied by the source and a downstream end connected to the bearing to support the rotary shaft with the pressurized gas; and
    a recovery conduit for recovering a gas that has been used in the bearing, the recovery conduit comprising an upstream end connected to the bearing, a downstream end connected to the cooling circuit between the upstream and downstream ends of the cooling circuit in order to recycle and liquefy at least some of the gas that has been used to support the rotary shaft of the bearing, the downstream end of the recovery conduit being connected to an outlet of the at least one expansion turbine.

2. The plant of claim 1, wherein the pressurized injection conduit further comprises at least one gas flow control valve.

3. The plant of claim 2, wherein the at least one gas flow control valve comprises at least one expansion valve.

4. The plant of claim 1, wherein the recovery conduit further comprises a portion exchanging heat with the at least one heat exchanger.

5. The plant of claim 1, wherein, between the upstream and downstream ends of the recovery conduit, the recovery conduit exchanges heat with the at least one heat exchanger of the cooling circuit.

6. The plant of claim 1, wherein the pressurized gas of the cooling circuit and the gas circulating in the recovery conduit are cooled in parallel and separately in the at least one heat exchanger before being mixed downstream.

7. The plant of claim 1, wherein the at least one expansion turbine is mounted on a first end of the rotary shaft, with the other end of the rotary shaft supporting a compressor located in a loop circuit for a working gas, said circuit comprising a portion exchanging heat with a cooling exchanger in order to cool the working gas compressed by the compressor.

8. The plant of claim 1, wherein the downstream end of the injection conduit comprises at least one nozzle for injecting the pressurized gas into the bearing that is configured to ensure a controlled reduction in pressure of said pressurized gas in the bearing and to keep a pressure of the gas that has been used in the bearing above a determined threshold.

9. A method for liquefying the flow of the hydrogen gas in the liquefying plant of claim 1, comprising the steps of: re-injecting, into the cooling circuit, at least some of the gas that has been used to support the rotary shaft of the bearing for liquefaction thereof.

10. The method of claim 9, wherein the gas to be liquefied is at least one of hydrogen, helium, neon, nitrogen, oxygen, and argon.

11. The method of claim 9, wherein a pressure of the gas to be liquefied originating from the source at the upstream end of the cooling circuit ranges between 5 and 80 bar abs and a pressure of the gas recovered from the upstream end of the recovery conduit ranges between 1.5 bar abs and 20 bar abs.

* * * * *